(12) United States Patent
Lazarovich et al.

(10) Patent No.: US 8,078,342 B2
(45) Date of Patent: Dec. 13, 2011

(54) METHOD FOR ACTIVE POWER MANAGEMENT AND ALLOCATION OF FUNCTIONALITY

(75) Inventors: David Lazarovich, Thornhill (CA); Joseph Nutaro, Phoenix, AZ (US); Ted Gayowsky, Mississauga (CA); Ileana Rusan, Toronto (CA); Sang-Joon Lee, Toronto (CA); Srinivasa Rao Dangeti, Razole (IN); Narasimha Rao Pesala, Bangalore (IN); Lakshminarayana Surisetty, Bangalore (IN); Gopi Gudimetla, Bangalore (IN); Amit Kumar Singh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 459 days.

(21) Appl. No.: 12/434,420

(22) Filed: May 1, 2009

(65) Prior Publication Data
US 2010/0280682 A1    Nov. 4, 2010

(51) Int. Cl.
G06F 1/28 (2006.01)
G06F 9/30 (2006.01)

(52) U.S. Cl. .................. 701/3; 701/1; 701/36; 700/295; 713/320

(58) Field of Classification Search .................. 701/3, 1, 701/35, 36, 22; 700/295; 307/23, 64, 39; 713/320
See application file for complete search history.

(56) References Cited

U.S. PATENT DOCUMENTS

| | | | |
|---|---|---|---|
| 5,422,517 A | 6/1995 | Verney | |
| 6,633,802 B2 | 10/2003 | Sodoski | |
| 7,076,350 B2 * | 7/2006 | Ivarez-Troncoso et al. | .... 701/36 |
| 7,406,370 B2 * | 7/2008 | Kojori et al. | .... 701/22 |
| 7,747,357 B2 * | 6/2010 | Murdoch | .... 700/295 |
| 2004/0254688 A1 * | 12/2004 | Chassin et al. | .... 700/295 |

* cited by examiner

Primary Examiner — Tan Q Nguyen
(74) Attorney, Agent, or Firm — Miriam Jackson, Esq.

(57) ABSTRACT

Methods for active power management, i.e., the power management method may be activated in response to changes in the supply and demand of power in a system, are disclosed. The power management method may use dynamically collected data reporting levels of electrical power utilized by systems while matching them to the available power. One embodiment of the present invention may be applied in smaller or medium sized systems. Another embodiment of the present invention may be implemented making use of additional aircraft resources, such as an integrated modular avionics (IMA) line replaceable unit (LRU) in larger sized systems. Both of these embodiments may make use of data collected from systems utilizing or generating electrical via the bus power control unit (BPCU) LRU, the data processing taking place either locally in the BPCU (small or medium sized systems) or in the IMA (larger systems).

18 Claims, 7 Drawing Sheets

| | | | | | | | | | | |
|---|---|---|---|---|---|---|---|---|---|---|
| Frame 1 | I_load1 | I_I2 | I_I3 | I_I4 | I_I5 | I_I6 | I_I7 | I_I8 | I_I9 | I_I10 |
| Frame 2 | I_I11 | I_I12 | I_I13 | I_I14 | I_I15 | I_I16 | I_I17 | I_I18 | I_I19 | I_I20 |
| ⋮ | ⋮ | ⋮ | ⋮ | ⋮ | ⋮ | ⋮ | ⋮ | ⋮ | ⋮ | ⋮ |
| Frame n | I_In-9 | I_In-8 | I_In-7 | I_In-6 | I_In-5 | I_In-4 | I_In-3 | I_In-2 | I_In-1 | I_In |

FIG. 7

| Trigger 1 | I_lgr_1 | I_lgr_2 | I_lgr_3 | I_lgr_4 | I_I5 | | | T-Vector_1 |
| Trigger 2 | I_lgr_7 | I_lgr_9 | I_lgr_8 | I_lgr_27 | I_lgr_36 | I_lgr_43 | | T_Vector_2 |
| ........ | : | : | : | : | : | : | : | : |
| Trigger n | I_lgr_1 | I_I_2 | I_I_3 | I_lgr_9 | I_lgr_77 | I_lgr_91 | I_lgr_88 | T_Vector_n |

| BUS | HVAC1 | HVAC2 | HVAC3 | HVAC4 | LVAC1 | LVAC2 | DC1 | DC2 | EMER |
| LOAD | XXX | XXX | XXX | XXX | XXX | XXX | XXX | XXX | XXX |
| SUPPLY | GEN_x | GEN_x | GEN_x | GEN_x | GEN_x | GEN_x | GEN_x | GEN_x | GEN_x |

METHOD FOR ACTIVE POWER MANAGEMENT AND ALLOCATION OF FUNCTIONALITY

BACKGROUND OF THE INVENTION

The present invention relates to methods for power management and, more particularly, methods for active power management responsive to changes in the supply and demand of electrical power in a system.

In an aerospace electrical power system the electrical power utilization needs to be managed. It is required that a balance between available power and consumed power by utilization systems is maintained in order not to exceed the supply capabilities of the electrical power sources. The capability of the generation sources is a fixed amount, independent of flight phases, is known, and is maintained in a power management implementation device. The consumed power by the utilization systems changes dynamically as a function of flight conditions and is reported to the same device. A continuous comparison is executed in order to detect any excursion of the consumed power above the available power level. If a departure is detected, the power management device disconnects or manages selected utilization systems to return the system to a balanced state.

In addition to the monitoring of system conditions to avoid overloads, power management is also used to manage the load transfers between system load buses in order to avoid shock loads during transfers and also to optimize the power consumption at the system level. Power management algorithms are applied during all modes of operation of the electrical power system; normal modes, i.e., all sources available, failure modes, during engine start up or shut down. In this way the electrical loading is adjusted in response to the changing conditions and availability of power on an aircraft.

As can be seen, there is a need for power management methods for power systems wherein changes in the supply and demand of power in a system may actively cause a response in the power management system.

SUMMARY OF THE INVENTION

In one aspect of the present invention, a method of active power management of an electrical system comprises acquiring a first data packet containing the present state vector of the electrical system; determining if a steady state trigger or a forward feed trigger is detected; using the first data packet previously acquired to determine which loads to be shed upon detection of the steady state trigger or the forward feed trigger; continually acquiring a second data packet containing a revised present state vector of the electrical system during the step of determining if the steady state trigger or the forward feed trigger is detected; and replacing the first data packet with the second data packet each time the second data packet data acquisition is completed, thereby making the first data packet the most recent complete set of the present state vector available for the electrical system.

In another aspect of the present invention, a method for active power management of an electrical system of an aircraft comprises acquiring a first present state vector of the electrical system in an integrated modular avionics (IMA) by data sent by an electrical power control system (EPCS); monitoring for a steady state trigger or a forward feed trigger in the EPCS; using the first present state vector previously acquired to determine which loads to be shed upon detection of the steady state trigger or the forward feed trigger; issuing a commend to shed loads from the EPCS; continually acquiring a revised present state vector of the electrical system; and replacing the first present state vector with the revised present state vector each time the second present state vector data acquisition is completed, thereby making the first present state vector the most recent complete set of data available for the electrical system.

In a further aspect of the present invention, a method of active power management of an electrical system comprises determining a first list of non-essential loads that are able to be shed; shedding said first list of non-essential loads; determining a second list of non-essential loads that are not to be shed; and determining a best combination of loads not to be shed wherein a cumulative loading of the loads not to be shed is less than an overload on said generator; wherein the determination of the best combination of loads not to be shed is based on a current measurement of the present state of the electrical system.

These and other features, aspects and advantages of the present invention will become better understood with reference to the following drawings, description and claims.

BRIEF DESCRIPTION OF THE DRAWINGS

FIG. 7 is a table showing the data contained in a present state vector computed from the load values transmitted by the electrical power control system, according to an embodiment of the present invention;

DETAILED DESCRIPTION OF THE INVENTION

Figure 1:
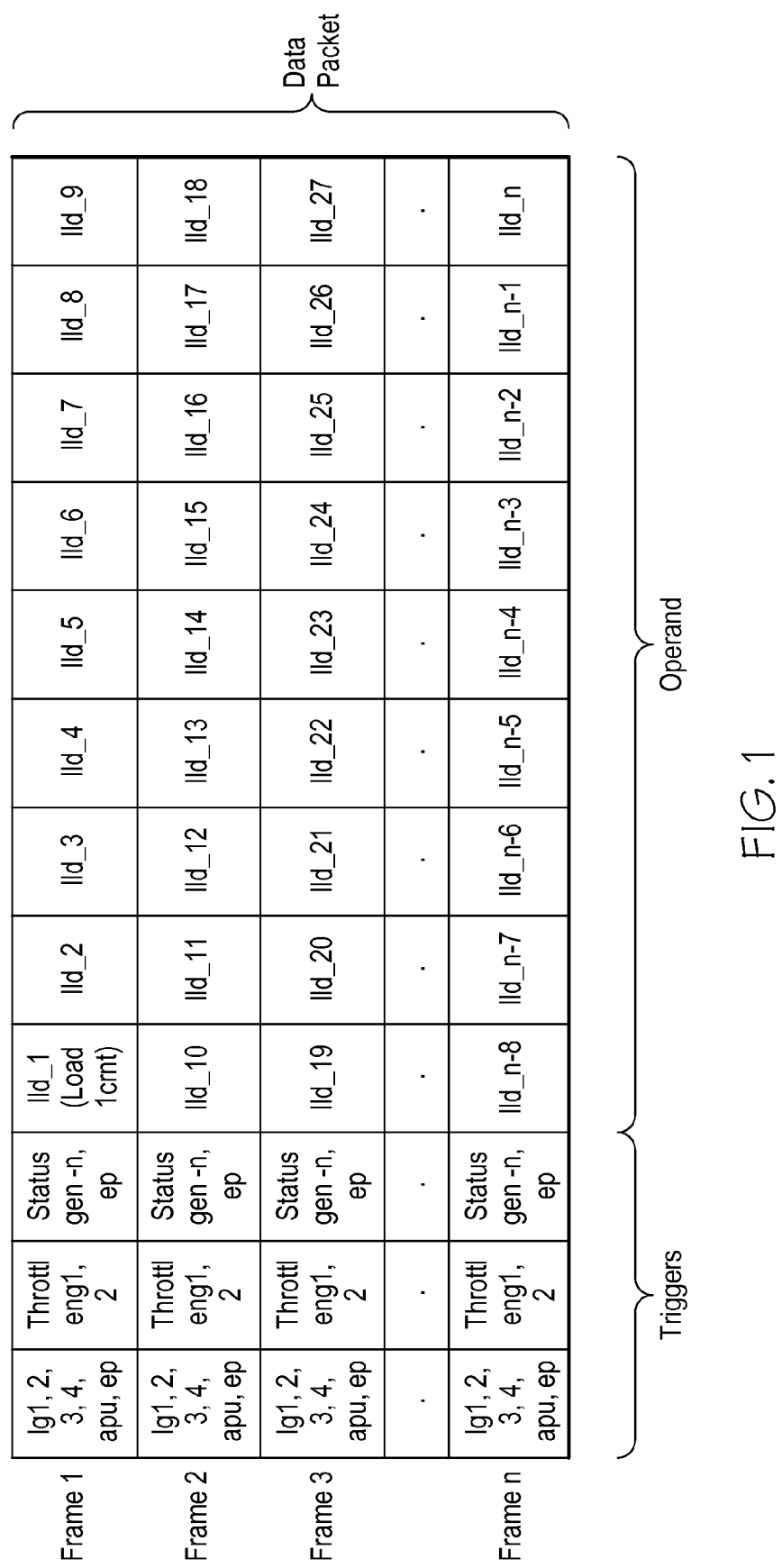
FIG. 1 is a table showing a data transmission packet comprising 'n' frames required for the acquisition of all load currents according to an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide methods for active power management, i.e., the power management method may be activated in response to changes in the supply and demand of power in a system. In addition, the power management method may use dynamically collected data reporting levels of electrical power utilized by systems while matching them to the available power. One embodiment of the present invention may be applied in smaller or medium sized systems. Another embodiment of the present invention may be implemented making use of additional aircraft resources, such as an integrated modular avionics (IMA) line replaceable unit (LRU) in larger sized systems. Both of these embodiments may make use of data collected from systems utilizing or generating electrical via the bus power control unit (BPCU) LRU, the data processing taking place either locally in the BPCU (small or medium sized systems) or in the IMA (larger systems).

Implementation of active power management (APM) implies the development of control algorithms. The algorithms may reside in a power management device and the target device may need to have significant computing power and be in close communication with the electrical power generation and distribution control system for acquisition and processing of operational parameters. Two main potential candidates for housing the APM may be the BPCU and the IMA.

The time allocated for the execution of the algorithms may be closely related to the expected qualitative performances of an electrical power supply system. The algorithms may be classified per their operational applicability:

normal system operation which may include operation with no fault in the system or transients related to the main engines starting or shut down, abnormal system operation which may include development of electrical faults in the system resulting in generation power sources failures, or start up or shut down of the airplane engines and transfer of power between internal and external power sources.

Some of the power management correction algorithms need to be executed in minimal time, i.e., within the 50 msec to 200 msec of bus transfer time, others may be executed at slower rates up to 1 second while taking advantage of the overload capability of generators which are usually sized for 125 percent overload for 5 minutes and 150 percent overload for 5 seconds.

Embodiments of the present invention may include methods of executing the power management actions and methods of using the acquired system data so minimum execution delay may be encountered.

The execution of the power management method described herein may be based on the acquisition and processing of two main system information data categories: 1) Triggers Data—which may be signals used to activate the power management action, i.e., identify the need for APM; and 2) Operands Data—which may be a set of data (load currents, etc.) acquired for the processing algorithms of power management.

Defining Triggers

The triggers that activate the APM activity may be classified according to the environment from which they are detected. With steady state triggers, no bus transfer may occur in the system at the time of the trigger detection. With feed forward triggers, bus transfers may be required as a result of the detection of and outgoing or incoming source of power.

Steady state triggers (SS_T) may be signaled when a measured load current exceeds source capability. Feed forward triggers (FF_T) may be signaled by the removal of external power to the system, removal of line of the APU generator, start up of a main engine and coming on line of main generators, shut down of an auxiliary power unit (APU) or main engine, or generator failure or shut off.

Defining Operands

The following are the operands which may be required to execute the APM—measured generator/source current, measured current of each one of the loads, connection status of the sources, look up table to include loads and groups of loads classified by criticality that need to be active (on line) during availability of any combination of the following sources: Left external power (EP); Right EP; (one or two EP external power connection may be available), APU generator; Left Main Generator/s; Right Main Generator/s. The look up tables may be used in general during initialization conditions of the airplane, i.e, at the first application of power from EP, APU generator, or main engine generators. It may be also assumed that these initialization connections are preprogrammed into the power distribution panels' functionality and therefore that these connection may not need to be activated by the APM device.

APM Data Acquisition of Triggers and Operands

Due to the multitude of loads on an airplane, it may be assumed that the load current values are transferred to the APM device on a data bus. More than one 'frame' may be required to transfer all data. For example, a 'packet' of 'n' frames may be required to transfer the load current information to the Active Power Management (APM) device. The APM device may acquire all data frames and compiles a 'present state' vector 'n−1'. In the 'present state' vector, the measured currents may be grouped per an assigned criticality level. A set of 'present state' 'n−1' data may be discarded and replaced when the following set is acquired and operated on. This is the 'n' vector.

In order to 'prepare' a 'present state' vector, in addition to the operand set, the triggers data needs also to be acquired. Engine throttle status (i.e. an engine start is occurring), generators switch state and generator connection status, EP connection status may need to be acquired.

Data Acquisition and Processing in the BPCU—Small and Medium Systems

For systems of this category, the trigger set should be acquired in each data frame, in addition to the load current data. When the acquisition of all frames is completed, the following steps may be taken:

Sum-up group currents, partition each group per bus, declare 'present state' including the information on each group; and Proceed with the acquisition of the data, prepare new 'present state' set, discard and replace precedent set.

A trigger may show up active in any of the received data frames; therefore, the following may be executed:

Execute APM algorithms as soon as a Triggers appears making use of the existing 'present state' set of data operands. (Since trigger may be acquired each frame, the reaction of the algorithm is each 'next' frame.)

FIG. 1 shows a data transmission 'packet' comprising 'n' frames required for the acquisition of all load currents (lid_1, 2 . . . , n). It is shown that all APM Triggers (where: Ig1, 2, . . . , n are generator currents; Throttl. Is engine throttle status, Status gen–n, is the connection/health status of the generator n, ep is the connection status of the external power) are collected in each frame of the packet.

Figure 2:
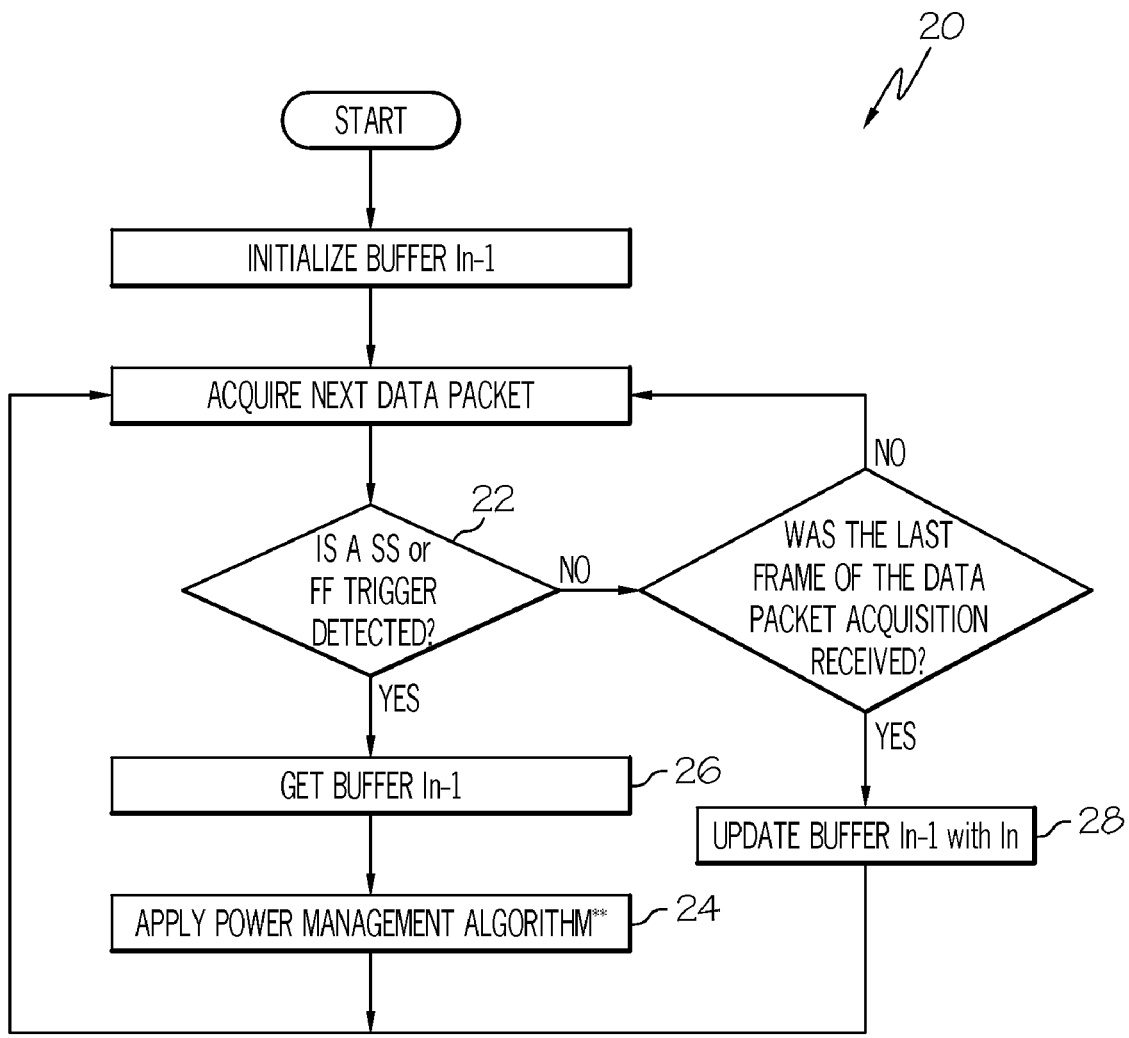
FIG. 2 is a flow chart showing the general detection and processing algorithm according to an embodiment of the present invention.

Referring also to FIG. 2, which shows a flow chart 20 describing a general detection and processing algorithm, if a Trigger is detected at decision point 22, APM actions may be launched at step 24, wherein the collection of the rest of load current data of the packet may be temporarily abandoned and the APM algorithms may be immediately executed using the set of 'present state' operands acquired during the previous 'packet' as shown in step 26. If there is no Trigger detected, and the data acquisition for the next packet is complete, then the buffer is updated so that the previous packet may not become the currently completed acquisition packet at step 28.

Power Management Algorithms

The power management algorithms can be classified according to their trigger into two main categories:

Steady State (SS_A) algorithms, and
Feed Forward (FF_A) algorithms.

Figure 3:
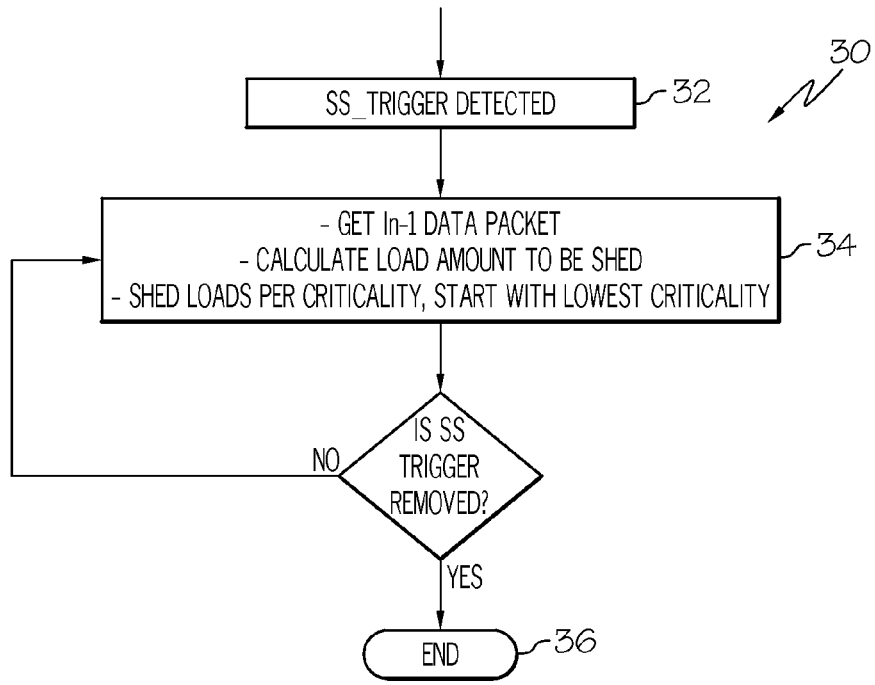
FIG. 3 is a flow chart showing an algorithm in accordance with the present invention for an APM steady state.

The 'Steady State' algorithm 30 of FIG. 3 may be applied when the load current exceeds the power source capability at step 32. This may occur during regular flight phase or flight phase change activities. When a steady state trigger is detected, the previously acquired data packet may be used to calculate the load to be shed, dependant on criticality of the loads, as shown in step 34. Once the trigger is removed at step 36, the steady state algorithm may end.

Generator current outside of the upper range may the trigger for the FIG. 3 (steady state) load shedding action. When an overload is detected, the load shedding process may be commenced; it may start with calculating and shedding the lowest criticality groups so that generator rating is not exceeded.

It may be recognized that the acquisition and the summing up of the multitude of loads may lag behind the acquisition of one generator current that triggers the process. Therefore, when the action is taken based on a detected overload of the generator, the algorithm may use a 'stale' 'present state' of group load currents. An assumption is made that a 200 ms set of 'stale' data is still valid for the execution of the algorithm. If a correction is required, it may be executed within the next few frames required to prepare a new set of 'present state' values.

Figure 4:
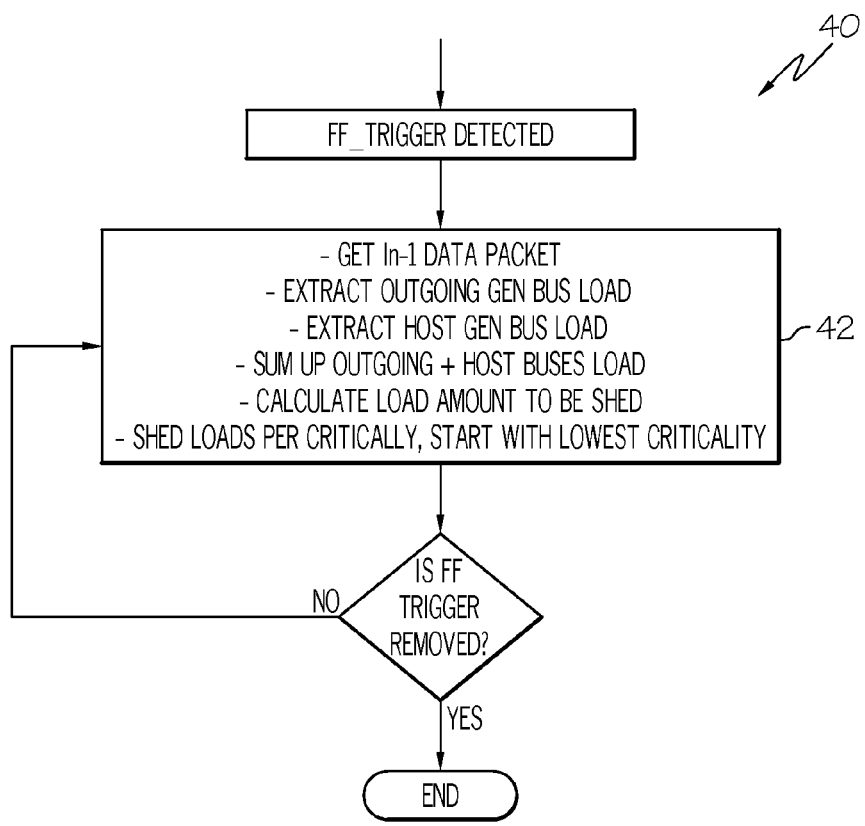
FIG. 4 is a flowchart showing an algorithm in accordance with the present invention for an APM feed forward state.

The 'Feed Forward' algorithms 40, as shown in FIG. 4, may be applied when a source signals its drop off-line. Under these circumstances, the bus loads provided for, up until this instant, by the outgoing source may be taken over by a different source. It may be assumed that the new source does not have the capability to carry its own bus loads and the failed source's bus loads together. Therefore, the APM algorithm, may prepare the 'new' load configuration on both, the 'incoming bus' and the 'receiving bus'. On both busses the loads may be 'trimmed' (such as by selective shedding—by criticality) so that their combined loads do not exceed the source capability, as shown by step 42. Immediately after the 'Feed Forward' algorithm, the 'Steady State' algorithms that continue to monitor loading status may be applied.

The Feed Forward algorithm 40 may be applied when a trigger pointing to a failure or an outgoing source is detected. Under these circumstances, it may be safe to assume that the power capability of the source that takes over the bus of the outgoing source will be exceeded. Therefore, in order to avoid overloading of the 'host' source, the algorithm may, at step 42, calculate, based on the available packet of data, the amount of load that needs to be removed/shed for the two busses, the incoming and the host bus, in order not to exceed the power capability of the generator. FIG. 4 depicts graphically that load management process.

It should be noted that in the above description, the term 'shed' loads may be applied liberally. This term should not be understood to mean only an off/on switching control of a load. Load power may be managed in other forms. These load managements methods may be any such load management methods known in the art.

Figure 5:
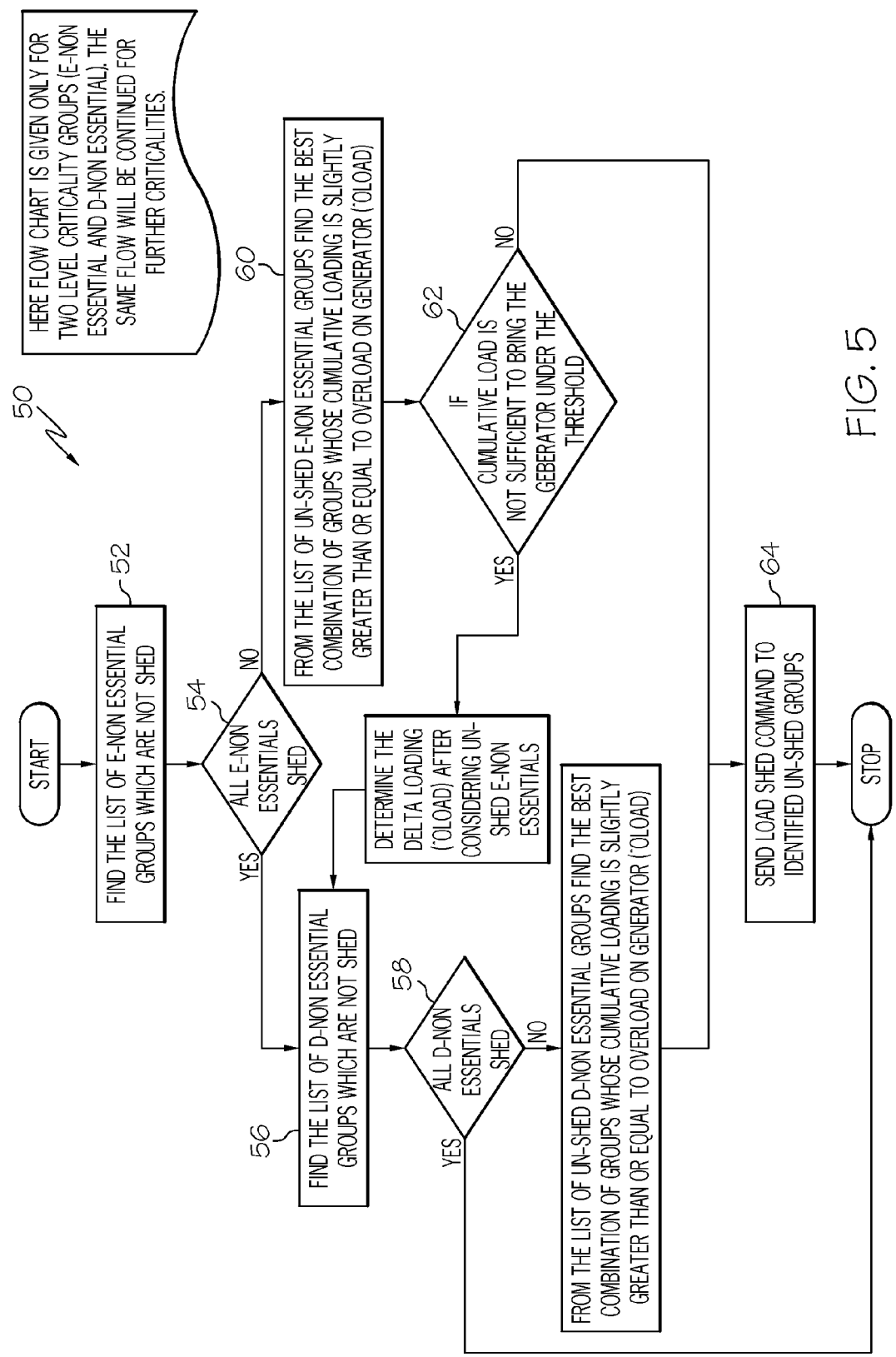
FIG. 5 is a flowchart showing a sample algorithm of the selection process of loads for shedding based on criticality.

Referring to FIG. 5, there is shown a sample algorithm 50 describing the selection process of loads for shedding based on criticality. The lowest criticality may be defined as "E" loads and step 52 may find a list of E-non-essential loads that are currently not shed. If all E loads are shed, at decision point 54, then D loads are found. If all D loads are shed, at decision point 56, then this algorithm may stop at step 58. The algorithm may continue, however, examining more critical loads.

If, at decision point 54, there are E loads that are not yet shed, then the best combination of loads to be shed is determined at step 60. If, at decision point 62, the combination of loads at step 60 is sufficient to correct the trigger, then a load shed command may be sent at step 64. If, at decision point 62, the combination of loads at step 60 is not sufficient to correct the trigger, then D loads may be considered for shedding as well.

While FIG. 5 describes one method for selection of loads for shedding based on criticality, other methods that may be known in the art may be used to shed loads. The loads may be shed, as described above, in an active power management system, where the power usage is continually monitored over time.

According to another embodiment of the present invention, an active power management (APM) method may be applied to larger systems, such as commercial aircraft, that include an integrated modular avionics (IMA) resource.

An Electrical Power Control System (EPCS) and the IMA are the two resources that may have the required processing power and the pertinent data for the performance of the power management.

In one embodiment of the present invention, a method may be applicable to large systems that may need processing capability in excess of the capability of the EPCS. A split implementation of the APM functionality between the IMA and the EPCS may be useful in this situation. The method may shorten various latencies in the system.

The power management allocation method according to one embodiment of the present invention is based on the following allocation of functionality to resources:

The power management algorithms may reside in the Integrated Modular Avionics (IMA); the IMA has significant computing power to accomplish the task of power management and is in close communication with the electrical power generation and distribution control system and other aircraft systems involved in the power transfer.

The data required for the power management function may be transferred to the IMA by the Electrical Power Control System (EPCS). The data may include the load current data actually consumed by the utilization subsystems.

From the data passed by the EPCS, the IMA may prepare a 'Present State' vector via summation of all load currents connected to the same bus/power source. The vector may be refreshed each time a new set of data is available.

The IMA may house (store) the series of pre-defined triggers (see below) that activate the power management process. Using the data in the 'Present State' vector and a load criticality schedule, the IMA may compile a series of 'Trigger vectors'. The 'trigger vectors' may include groups of loads that would need to be shed when and if any of the pre-defined triggers occur. A 'Trigger vector' may be associated to each one of the pre-defined triggers.

The refreshing of the 'Trigger Vectors' may occur periodically subsequent to the acquisition of a new 'Present State Vector'.

The 'Trigger Vectors' may be sent via data bus from the IMA and stored in the EPCS unit memory. The transmission may occur only when there is a change in the value of the vector, in order to save system resources.

Once a Trigger is detected, the EPCS may broadcast the required load shed commands to the distribution system.

The commands may be derived from the available 'Trigger Vector' at that point in time. It is important to mention that the shed action may be a direct command from the EPCS to the Distribution system, without direct IMA intervention.

This functionality allocation (computing in IMA and commands initiated in the EPCS) may allow the system to meet the timing requirements of a power management required action. For example, some of the power management corrective actions need to be executed in minimal time, i.e., within the 50 msec to 200 msec of bus transfer time, others may be executed at slower rates up to 1 second while taking advantage of the overload capability of generators which are usually sized for 1.25 PU for 2 minutes and 1.5 PU for 5 seconds.

The methods according to exemplary embodiments of the present invention may execute the power management action so minimum execution time delay is encountered.

The execution of the power management method described herein may be based on the acquisition and processing of two main system information data categories:

Triggers Data—signals used to activate the power management action, i.e., identify the need for APM, and Operands Data—set of data (load currents, etc.) acquired for the computation of the 'Present State Vector' and the 'Trigger Vectors' as mentioned above.

Trigger Data may be used to start up the process of power management immediately that a condition requiring an action is detected.

APM Data Acquisition Towards Execution of APM Function; IMA Data Handling

Due to the multitude of loads on an airplane, the current values may be transferred to the IMA on a data bus (CAN or FlexRay etc.). More than one 'frame' may be required to transfer all data. A 'packet' of 'n' frames may be required to transfer the load current information to the IMA. The APM device may acquire all data frames and compile a 'present state' vector 'n−1'. In the 'present state' vector, the measured currents may be grouped per connection bus and assigned criticality. A set of 'present state' vector 'n−1' data may be discarded and replaced when the following set is acquired and operated on the 'n' vector.

'Present State' Vector Computation:

In a medium sized airplane, there are on average 600 to 1000 different loads, most of them 3 phase loads. Therefore, the current data may be acquired in (as many) frames as necessary. When the acquisition of all frames is completed, the following steps may be taken:

Sum-up group currents, partition each group per bus, declare 'present state' including the information on each group; and Proceed with the acquisition of the data, prepare new 'present state' set, discard and replace precedent set.

'Trigger Vector' Compilation:

Based on the information included in each generated 'present state' vector, the IMA may prepare continuously a set of 'Trigger vectors'. These vectors may represent the selected groups of loads that would be required to be shed in case of appearance of any defined APM trigger; i.e., each potential trigger has an associated Trigger vector; this vector may define the loads to be shed.

The 'Trigger vectors' may be computed by the IMA via application of the applicable load management algorithms on the 'Present State Vector' under the hypothesis that a Trigger has been detected.

EPCS Data Handling

The 'Trigger vectors' may be continuously downloaded to the EPCS. The EPCS may store in its memory the set of 'Trigger vectors'. The 'Trigger vectors' may be refreshed each time a new set is received form the IMA. The old set may then be discarded and replaced with the new values.

The EPCS may be monitoring the trigger signals continuously. Once a trigger is detected, the respective 'Trigger vector' stored in the EPCS memory containing the groups information to be shed may be decomposed in 'shed' commands to be transferred to the respective loads in the distribution Panels.

Figure 6:
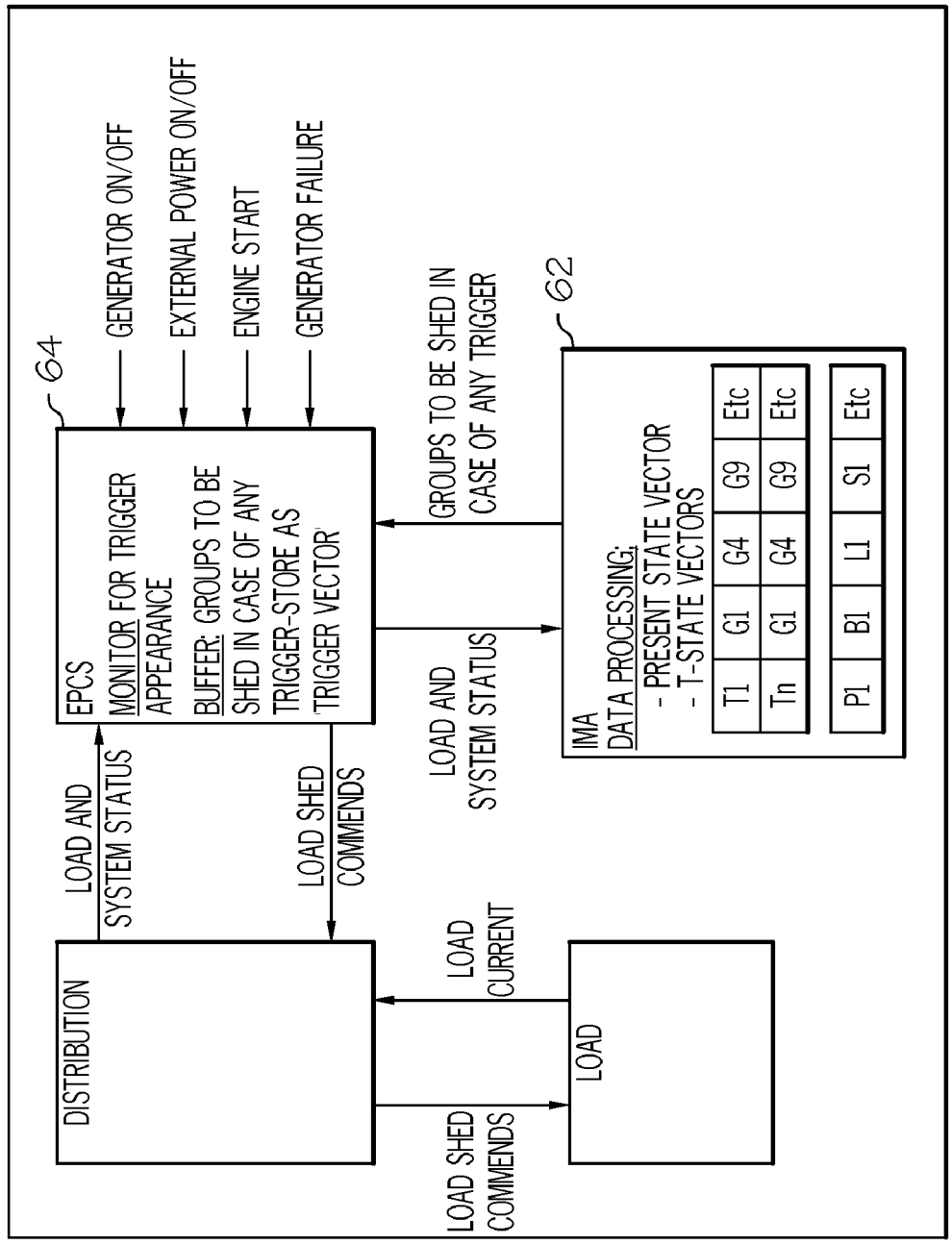
FIG. 6 is a schematic drawing showing the implementation of an active power management functionality according to an embodiment of the present invention.

FIG. 6 shows a pictorial description of the flow of signals, shown as arrows, that may take part in the implementation of the power management activity. These flow signals describe the APM functionality shared between the IMA 62 and the EPCS 64 as described in the above paragraphs.

The split implementation of the APM functionality between the IMA and the EPCS may alleviate execution latency concerns. The IMA is a computing intensive platform that may service a number of applications in addition to the APM. Each incoming frame of data may be received by the IMA core processor and may be decomposed in 'slices' designated to each one of the applications. The APM may have allocated a 10% partition of the frame data. The compilation process of a 'present state vector' and its subsequent 'trigger vectors' set may take 'seconds'. The APM triggers, on the other hand, may be detected by the EPCS. The EPCS is the bus power control device and inherently is informed about any electrical system status changes. If the trigger would be transferred to the IMA to associate with the 'trigger vector' and then the shed commands transferred via the EPCS to the distribution panels—this operation may take an interval of time not compatible with the 50 milliseconds requirement of bus power transfer.

Using the proposed sequence of downloading and constantly refreshing the 'trigger vectors' in the EPCS, and directly passing by the EPCS the respective SHED commands (once a trigger is detected) directly to the distribution panels valuable cycle time may be saved.

Referring to FIG. 7, there is shown a graphic representation of a present state vector 70 having n frames. This present state vector 70 may be determined by load values transferred to the IMA from the EPCS.

Figures 8, 9:
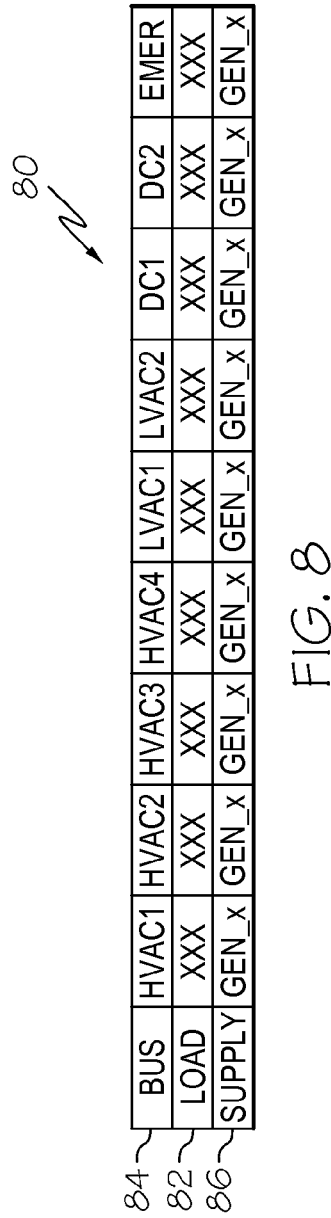
FIG. 8 is a table showing computed bus load values and information on supplier source for the present state vector of FIG. 7.
FIG. 9 is a table showing the trigger vectors associated with specific triggers based on the present state vector of FIG. 7.

Referring to FIG. 8, there is shown a data table 80 of a present state vector including computed bus load values 82 on various busses 84 and information on supplier sources 86.

Referring to FIG. 9, there is shown one example of trigger groups, labeled as T_Vector_1, T_Vector_2 ... T_Vector_n that may be associated with specific triggers, labeled as Trigger 1, Trigger 2 .... Trigger n. When one of the particular Triggers is detected, the loads of a particular Trigger Vector may be shed, according to one embodiment of the present invention.

It should be understood, of course, that the foregoing relates to exemplary embodiments of the invention and that modifications may be made without departing from the spirit and scope of the invention as set forth in the following claims.

We claim:

1. A method of active power management of an electrical system, the method comprising:

acquiring a first data packet containing the present state vector of the electrical system;

determining if a steady state trigger or a forward feed trigger is detected;

using the first data packet previously acquired to determine which loads to be shed upon detection of the steady state trigger or the forward feed trigger;

continually acquiring a second data packet containing a revised present state vector of the electrical system during the step of determining if the steady state trigger or the forward feed trigger is detected; and replacing the first data packet with the second data packet each time the second data packet data acquisition is completed, thereby making the first data packet the most recent complete set of the present state vector available for the electrical system.

2. The method of claim 1, further comprising, when a steady state trigger is detected:
calculating the load amount to be shed; and
shedding loads starting with the loads having the lowest criticality.

3. The method of claim 1, further comprising, when a feed forward trigger is detected:
extracting an outgoing generator bus load value and a host generator bus load value from the first data packet;
summing the outgoing generator bus load value and the host generator bus load value;
calculating the load amount to be shed; and
shedding loads starting with the loads having the lowest criticality.

4. The method of claim 1, wherein the steady state trigger is caused by a measured load current exceeding the capability of a source thereof.

5. The method of claim 1, wherein the forward feed trigger is caused by at least one of removal of external power from the system, removal off-line of an auxiliary power unit, start up of a main engine and coming on-line of a main generator, shut down of the auxiliary power unit or the main engine, or generator failure or switch-off.

6. The method of claim 1, further comprising:
executing power management algorithms in an integrated modular avionics of an aircraft; and
transferring data required for the power management algorithms to the integrated modular avionics by an electrical power control system.

7. The method of claim 6, wherein the present state vector of the electrical system is prepared in the integrated modular avionics.

8. The method of claim 7, wherein the electrical power control system directly broadcasts a command to shed loads to a power distribution system of the electrical system.

9. The method of claim 8, wherein the command to shed loads is executed within from about 50 milliseconds to about 200 milliseconds upon detection of a trigger.

10. A method for active power management of an electrical system of an aircraft, the method comprising:
acquiring a first present state vector of the electrical system in an integrated modular avionics (IMA) by data sent by an electrical power control system (EPCS);
monitoring for a steady state trigger or a forward feed trigger in the EPCS;
using the first present state vector previously acquired to determine which loads to be shed upon detection of the steady state trigger or the forward feed trigger;
issuing a command to shed loads from the EPCS;
continually acquiring a revised present state vector of the electrical system; and
replacing the first present state vector with the revised present state vector each time the second present state vector data acquisition is completed, thereby making the first present state vector the most recent complete set of data available for the electrical system.

11. The method of claim 10, further comprising storing a set of pre-defined triggers in the IMA.

12. The method of claim 11, further comprising compiling a set of trigger vectors in the IMS, the trigger vectors including groups of loads that would need to be shed when and if any of the pre-defined triggers occur.

13. The method of claim 12, further comprising associating each of the set of trigger vectors to each of the pre-defined triggers.

14. The method of claim 13, further comprising periodically refreshing the set of trigger vectors based on the most current first present state vector.

15. The method of claim 14, further comprising sending the set of trigger vectors from the IMA and storing the trigger vectors in the EPCS.

16. The method of claim 15, further comprising, once a trigger is detected, broadcasting, from the EPCS, a load shed command to the electrical system without IMA intervention.

17. A method of active power management of an electrical system, the method comprising:
determining a first list of non-essential loads that are able to be shed;
shedding said first list of non-essential loads;
determining a second list of non-essential loads that are not to be shed; and
determining a best combination of loads not to be shed wherein a cumulative loading of the loads not to be shed is less than an overload on said generator; wherein
the determination of the best combination of loads not to be shed is based on a current measurement of the present state of the electrical system.

18. The method of claim 17, further comprising:
continually recalculating the present state vector of the electrical system; and
replacing the present state vector of the electrical system with a recalculated presented state vector once the recalculating step is complete.

* * * * *